(12) United States Patent
Saito

(10) Patent No.: US 11,698,507 B2
(45) Date of Patent: Jul. 11, 2023

(54) OPTICAL ELEMENT, METHOD OF PRODUCING OPTICAL ELEMENT, AND DISPLAY DEVICE

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 157 days.

(21) Appl. No.: 17/001,704

(22) Filed: Aug. 25, 2020

(65) Prior Publication Data

US 2021/0063671 A1 Mar. 4, 2021

(30) Foreign Application Priority Data

Aug. 28, 2019 (JP) ................. 2019-156021

(51) Int. Cl.
*G02B 7/00* (2021.01)
*G02B 5/32* (2006.01)
(Continued)

(52) U.S. Cl.
CPC ............... *G02B 7/008* (2013.01); *G02B 5/32* (2013.01); *G02B 27/0172* (2013.01);
(Continued)

(58) Field of Classification Search
CPC . G02B 7/00; G02B 7/008; G02B 5/32; G02B 27/0172; G02B 27/0176; G02B 2027/0174; G02B 2027/0178; G02B 2027/0109; G02B 2027/011; G02B 2027/0145; G02B 2027/0192; G02B 2027/0198; G02B 27/4283; G02B 27/0025; G02B 27/005; G02B 7/028; G02B 7/181; G02B 7/185; G03H 2001/0088; G03H 2001/2231; G03H 2001/0232; G03H 2001/186; G03H 2270/14; G03H 2270/21; G03H 2270/55; G03H 1/0005; G03H 1/0272; G03H 1/02; G03H 1/04;
(Continued)

(56) References Cited

U.S. PATENT DOCUMENTS 6,348,993 B1 * 2/2002 Hori ................. G03B 21/62
359/443
2009/0086341 A1 4/2009 Kikuchi et al.
(Continued)

FOREIGN PATENT DOCUMENTS

CN 101398523 4/2009
CN 109425989 3/2019
(Continued)

*Primary Examiner* — Stephone B Allen
*Assistant Examiner* — Jyotsna V Dabbi
(74) *Attorney, Agent, or Firm* — JCIPRNET

(57) ABSTRACT

An optical element includes a hologram layer, a resin substrate to which the hologram layer is adhered, and a holder portion that supports the resin substrate and has a thermal expansion coefficient smaller than that of the resin substrate. One of the holder portion and the resin substrate includes a contact surface along an axis extending in a plate thickness direction of the resin substrate, and the other of the holder portion and the resin substrate includes a pressing surface that presses the contact surface.

9 Claims, 10 Drawing Sheets

(51) Int. Cl.
  *G03H 1/02* (2006.01)
  *G02B 27/01* (2006.01)
  *G03H 1/22* (2006.01)
  *G03H 1/00* (2006.01)
  *G03H 1/18* (2006.01)

(52) U.S. Cl.
  CPC ......... *G03H 1/0005* (2013.01); *G03H 1/0272* (2013.01); *G03H 1/181* (2013.01); *G03H 1/2202* (2013.01); *G02B 2027/0174* (2013.01); *G02B 2027/0178* (2013.01); *G03H 2001/0088* (2013.01); *G03H 2001/2231* (2013.01); *G03H 2270/14* (2013.01); *G03H 2270/21* (2013.01)

(58) Field of Classification Search
  CPC ........ G03H 1/18; G03H 1/181; G03H 1/2202; G03H 1/12; G03H 1/0486; G03H 2223/23; G03H 2227/05
  USPC ........................................................... 359/14
  See application file for complete search history.

(56) References Cited

U.S. PATENT DOCUMENTS

| | | | |
|---|---|---|---|
| 2014/0232619 A1* | 8/2014 | Hiraide | G02B 27/0176 345/8 |
| 2015/0279114 A1 | 10/2015 | Yunekubo | |
| 2016/0291543 A1* | 10/2016 | Saito | G03H 1/0252 |
| 2019/0056598 A1 | 2/2019 | Saito | |

FOREIGN PATENT DOCUMENTS

| | | | |
|---|---|---|---|
| JP | 2012088643 A * | 5/2012 | ............... G03H 1/02 |
| JP | 2015191026 | 11/2015 | |
| JP | 2019035907 | 3/2019 | |

* cited by examiner

ENVIRONMENTAL TEMPERATURE: -30°C OR HIGHER

ND DISPLAY DEVICE

OPTICAL ELEMENT, METHOD OF PRODUCING OPTICAL ELEMENT, AND DISPLAY DEVICE

The present application is based on, and claims priority from JP Application Serial Number 2019-156021, filed Aug. 28, 2019, the disclosure of which is hereby incorporated by reference herein in its entirety.

BACKGROUND

1. Technical Field

The present disclosure relates to an optical element, a method of producing an optical element, and a display device.

2. Related Art

As a display device using a diffraction element such as a holographic element, it is conceivable to adopt a display device in which imaging light emitted from an imaging light generating device is deflected toward an eye of an observer by a diffraction element. The diffraction element is formed by adhering a hologram layer to a resin substrate.

By performing interference exposure on a hologram material adhered to the resin substrate, using laser light, the diffraction element forms interference fringes in the hologram layer. Since the hologram material expands or contracts during the interference exposure, there is a risk that the resin substrate deforms as a result of expansion or contraction of the resin substrate along with the hologram material. When the resin substrate deforms during the interference exposure in this manner, as a result of the hologram material being exposed in a state in which the hologram material is deformed, interference fringes with different diffraction angles are formed in the hologram layer, and thus a desired performance is not obtained.

Further, in the diffraction element, as a result of the resin substrate expanding or contracting in accordance with an environmental temperature during the actual use, the hologram layer adhered to the resin substrate deforms. When the hologram layer deforms in this manner, the interference fringes in the hologram layer change. When the interference fringes change in this manner, the diffraction angles of the hologram layer significantly change, and thus the desired performance is not obtained.

SUMMARY

In order to solve the problems described above, an optical element according to an aspect of the present disclosure includes a hologram layer, a resin substrate to which the hologram layer is adhered, and a holder portion configured to support the resin substrate and having a thermal expansion coefficient smaller than that of the resin substrate. One of the holder portion and the resin substrate includes a contact surface along an axis extending in a plate thickness direction of the resin substrate, and the other of the holder portion and the resin substrate includes a pressing surface that presses the contact surface.

The holder portion may have an elastic modulus greater than that of the resin substrate.

One of the resin substrate and the holder portion may include a concave portion, and the other of the resin substrate and the holder portion may include a convex portion that is inserted into the concave portion. One of the concave portion and the convex portion may configure the contact surface, and the other of the concave portion and the convex portion may configure the pressing surface.

Planar shapes of the convex portion and the concave portion may be frame shapes.

The resin substrate may have a curved shape.

A method of production the optical element may include a first step of causing the pressing surface to come into contact with the contact surface at a temperature higher than both an upper limit of a usage environmental temperature, at which the optical element is used, and an exposure environmental temperature, at which interference exposure is performed to form interference fringes in the hologram layer.

A method of producing the optical element may include a first step of causing the pressing surface to come into contact with the contact surface at a temperature lower than both a lower limit of a usage environmental temperature, at which the optical element is used, and an exposure environmental temperature, at which interference exposure is performed to form interference fringes in the hologram layer.

In the first step, a hologram material for forming the hologram layer may be adhered to the resin substrate, and after the first step, the interference exposure may be performed on the hologram material adhered to the resin substrate, thereby forming the hologram layer.

A display device includes an imaging light generating device configured to generate imaging light, and an optical system including a diffraction element that diffracts the imaging light emitted from the imaging light generating device. The diffraction element is configured of the optical element described above.

The display device may include a frame configured to mount the optical element on a head of an observer, with the hologram layer being placed in front of an eye of the observer, and the holder portion may be a portion of the frame.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
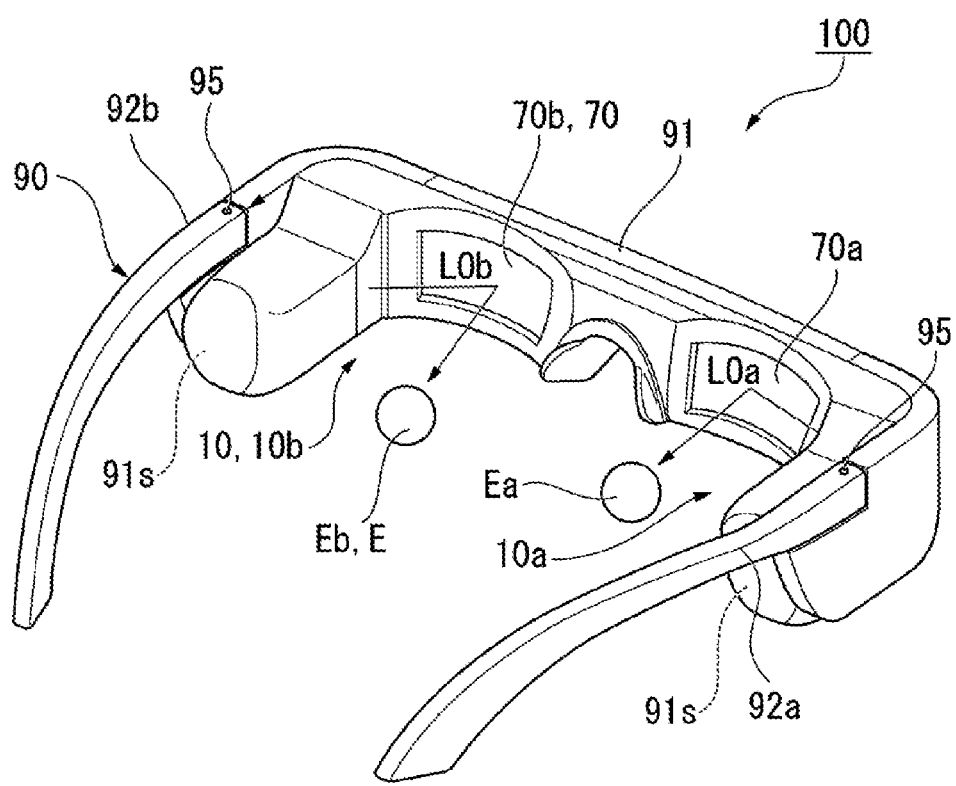
FIG. 1 is an external view illustrating an aspect of an external appearance of a display device according to a first exemplary embodiment.
Figure 1:
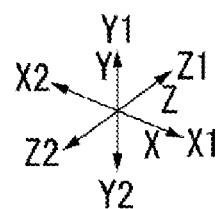
Figure 2:
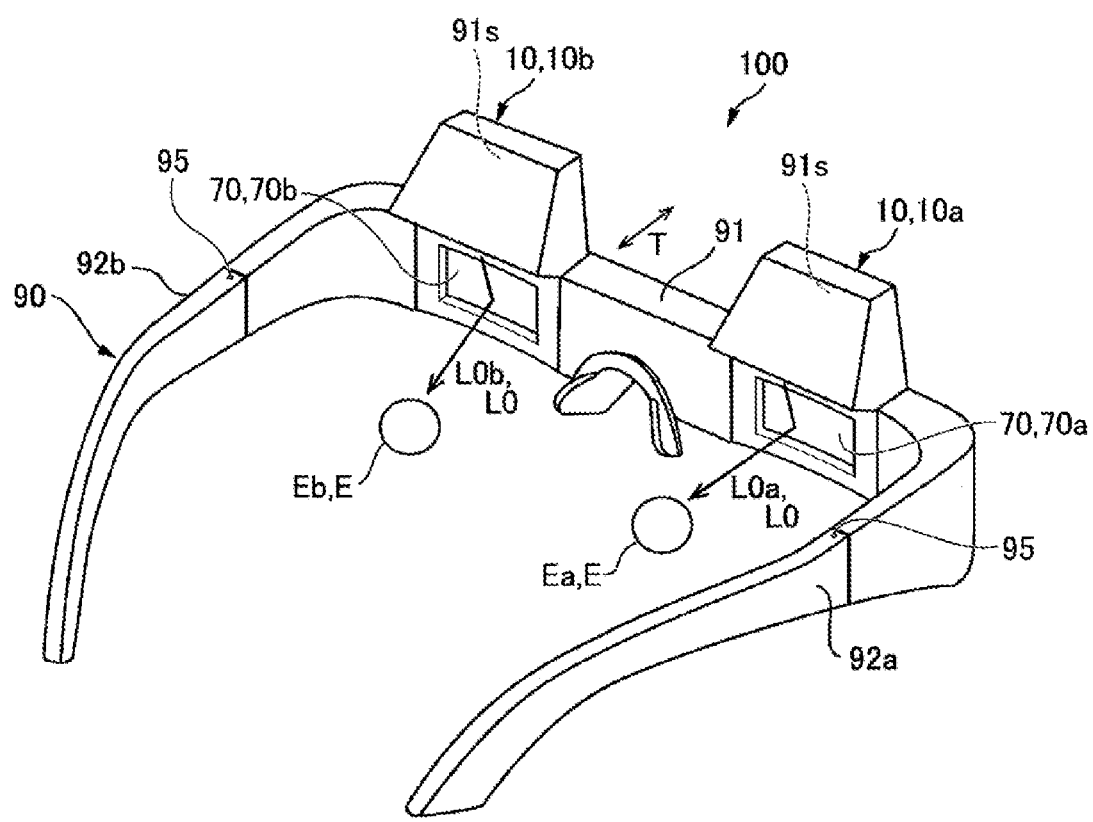
FIG. 2 is an external view illustrating another aspect of the external appearance of the display device.
Figure 3:
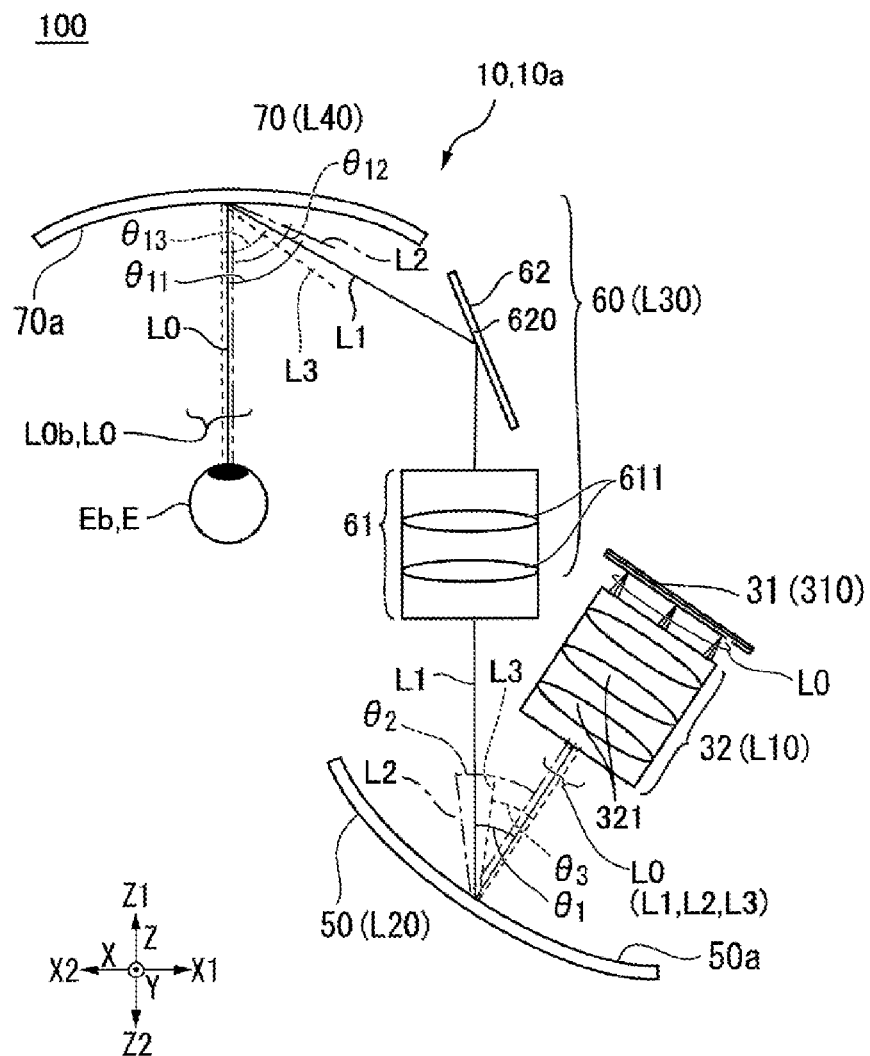
FIG. 3 is an explanatory diagram illustrating an aspect of an optical system of the display device.

FIG. 1 is an external view illustrating an aspect of an external appearance of a display device 100 according to the present exemplary embodiment. FIG. 2 is an external view illustrating another aspect of the external appearance of the display device 100. FIG. 3 is an explanatory diagram illustrating an aspect of an optical system 10 of the display device 100 illustrated in FIG. 1. Note that, in FIG. 1 to FIG. 3, a front-rear direction relative to an observer wearing the display device is defined as a direction along a Z axis, one side in the front-rear direction corresponding to the front direction of the observer wearing the display device is defined as a front side Z1, and the other side in the front-rear direction corresponding to the rear direction of the observer wearing the display device is defined as a rear side Z2. In addition, a left-right direction with respect to the observer wearing the display device 100 is defined as a direction along an X axis, one side in the left-right direction corresponding to the rightward direction of the observer wearing the display device is defined as a right side X1, and the other side in the left-right direction corresponding to the leftward direction of the observer wearing the display device is defined as a left side X2. Further, an up-down direction with respect to the observer wearing the display device 100 is defined as a direction along a Y axis, one side in the up-down direction corresponding to the upward direction of the observer wearing the display device is defined as an up side Y1, and the other side in the up-down direction corresponding to the downward direction of the observer wearing the display device is defined as a down side Y2.

The display device 100 illustrated in FIG. 1 is a head-mounted display device, and includes a right-eye optical system 10a that causes imaging light L0a to be incident on a right eye Ea and a left-eye optical system 10b that causes imaging light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted on the head of the observer using the housing 90.

In the display device 100, the housing 90 includes a frame 91, a temple 92a provided on the right side of the frame 91 and locked on the right ear of the observer, and a temple 92b provided on the left side of the frame 91 and locked on the left ear of the observer. The frame 91 includes storage spaces 91s on both sides of the frame 91, and the storage spaces 91s house components such as an imaging light projecting device that configures the optical system 10 to be described below. The temples 92a and 92b are foldably coupled to the frame 91 by hinges 95.

The right-eye optical system 10a and the left-eye optical system 10b have the same basic configuration. Therefore, in the description below, the right-eye optical system 10a and the left-eye optical system 10b will be described as the optical system 10 without distinction.

Further, in the display device 100 illustrated in FIG. 1, imaging light L0 is caused to travel in the left-right direction along the X axis. However, as illustrated in FIG. 2, the imaging light L0 may be caused to travel from the up side Y1 to the down side Y2 and enter eyes E of the observer, or the optical system 10 may be disposed to cover an area from the top of the head to the front of the eyes E.

A basic configuration of the optical system 10 of the display device 100 will be described with reference to FIG. 3. FIG. 3 is an explanatory diagram illustrating an aspect of an optical system 10 of the display device 100 illustrated in FIG. 1. Note that in addition to light L1 (solid lines) with a specific wavelength of the imaging light L0, FIG. 3 also illustrates light L2 (dot-and-dash lines) on a long wavelength side, and light L3 (dotted lines) on a short wavelength side with respect to the specific wavelength.

As illustrated in FIG. 3, in the optical system 10, a first optical unit L10 having positive power, a second optical unit L20 having positive power, a third optical unit L30 having positive power, and a fourth optical unit L40 having positive power are disposed along a traveling direction of the imaging light L0 emitted from an imaging light generating device 31.

In the present exemplary embodiment, the first optical unit L10 having positive power is configured by a projection optical system 32. The second optical unit L20 having positive power is configured by a reflection-type first diffraction element 50. The third optical unit L30 having positive power is configured by a light guiding system 60. The fourth optical unit L40 having positive power is configured by a reflection-type second diffraction element 70. In the present exemplary embodiment, the first diffraction element 50 and the second diffraction element 70 are reflection-type diffraction elements.

In such an optical system 10, when focusing on the traveling direction of the imaging light L0, the imaging light generating device 31 emits the imaging light L0 toward the projection optical system 32, the projection optical system 32 emits the incident imaging light L0 toward the first diffraction element 50, and the first diffraction element 50 emits the incident imaging light L0 toward the light guiding system 60. The light guiding system 60 emits the incident imaging light L0 toward the second diffraction element 70, and the second diffraction element 70 emits the incident imaging light L0 toward the eye E of the observer.

In the present exemplary embodiment, the imaging light generating device 31 generates the imaging light L0.

The imaging light generating device 31 may adopt an aspect in which it includes a display panel 310, such as an organic electroluminescent display element. According to such an aspect, the display device 100 that is compact and capable of displaying a high-quality image can be provided. Further, the imaging light generating device 31 may adopt an aspect in which it includes an illumination light source (not illustrated) and the display panel 310, such as a liquid crystal display element, that modulates illumination light emitted from the illumination light source. According to such an aspect, since the illumination light source can be selected, there is an advantage that the degree of freedom with respect to wavelength characteristics of the imaging light L0 is increased. Here, the imaging light generating device 31 can adopt an aspect in which it includes the single display panel 310 capable of performing color display. Further, the imaging light generating device 31 may adopt an aspect in which it includes a plurality of the display panels 31a corresponding to respective colors, and a synthesis optical system that synthesizes imaging light of the respective colors emitted from the plurality of display panels 31a. Furthermore, the imaging light generating device 31 may adopt an aspect in which laser light is modulated using a micro-mirror device.

The projection optical system 32 is an optical system that projects the imaging light L0 generated by the imaging light generating device 31, and is configured by a plurality of lenses 321. In FIG. 3, the projection optical system 32 includes three of the lenses 32a, but the number of the lenses 32a is not limited to three, and the projection optical system 32 may include four or more of the lenses 32a. Further, each the lenses 32a may be adhered together when configuring the projection optical system 32. Furthermore, the lens 32a may be configured by a lens having a free form surface.

The light guide system 60 includes a lens system 61 on which the imaging light L0 emitted from the first diffraction element 50 is incident, and a mirror 62 that emits the imaging light L0 emitted from the lens system 61 in an obliquely inclined direction. The lens system 61 includes a plurality of lenses 611 disposed in the front-rear direction along the Z axis. The mirror 62 includes a reflective surface 620 inclined diagonally with respect to the front-rear direction. In the present exemplary embodiment, the mirror 62 is a total reflection mirror. However, the mirror 62 may be a half mirror, and in this case, a range in which external light is visible can be widened.

Next, a configuration of the first diffraction element 50 and the second diffraction element 70 will be described.

In the present exemplary embodiment, the first diffraction element 50 and the second diffraction element 70 have the same basic configuration. A configuration of the second diffraction element 70 will be described below as an example.

The second diffraction element (optical element) 70 is a reflective-type volume holographic element. The second diffraction element 70 configures a partially transmissive/reflective combiner. Thus, since the external light is incident on the eye E via the second diffraction element 70, the observer can recognize an image in which the imaging light L0 formed by the imaging light generating device 31 and the external light (background) are superimposed on each other.

As illustrated in FIG. 3, the second diffraction element 70 faces the eye E of the observer, and an incident surface 70a of the second diffraction element 70 on which the imaging light L0 is incident has a concave surface that is recessed in a direction away from the eye E. In other words, the incident surface 70a has a shape having a central portion recessed and curved with respect to a peripheral portion thereof in an incident direction of the imaging light L0. Thus, the second diffraction element 70 can efficiently condense the imaging light L0 toward the eye E of the observer.

Figure 4:
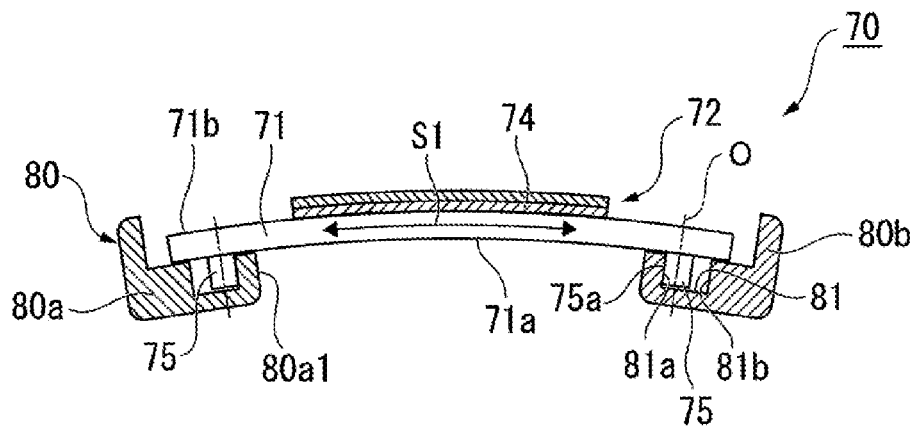
FIG. 4 is a cross-sectional view illustrating a configuration of main components of a second diffraction element.

FIG. 4 is a cross-sectional view illustrating main components of the second diffraction element 70. Note that FIG. 4 illustrates a state of the second diffraction element 70 in a case in which the second diffraction element 70 is used at an environmental temperature, that is from −20° C. to 40° C., for example, at which it is assumed that the display device 100 is used.

As illustrated in FIG. 4, the second diffraction element 70 includes a resin substrate 71, holder portions 80 that support the resin substrate 71, and a hologram layer 72 adhered to the resin substrate 71. The resin substrate 71 has a curved surface shape so that an outer surface 71b is convex with respect to an inner surface 71a.

Examples of the material that forms the resin substrate 71 include plastic, such as polymethyl methacrylate resin (PMMA), polycarbonate resin (PC), polyethylene terephthalate resin (PET), and polyamide resin (PA). The thickness of the resin substrate 71 is from 500 μm to 5 mm, for example.

In the present exemplary embodiment, the holder portion 80 and the resin substrate 71 have different thermal expansion coefficients. Further, the holder portion 80 and the resin substrate 71 also have different elastic moduli. The thermal expansion coefficient of the resin substrate 71 is from 60 ppm/° C. to 80 ppm/° C., for example, while the thermal expansion coefficient of the holder portion 80 is 30 ppm/° C. or lower. In other words, the thermal expansion coefficient of the holder portion 80 is smaller than the thermal expansion coefficient of the resin substrate 71. Specifically, Super Invar (thermal expansion coefficient: 1 ppm/° C.) is used as the material of the holder portion 80 of the present exemplary embodiment. In the present exemplary embodiment, the holder portion 80 is configured by a portion of the frame 91 of the display device 100 illustrated in FIG. 1. The frame 91 causes the second diffraction element 70 to be mounted on the head of the observer so that the hologram layer 72 is placed in front of the eye E of the observer. By using the portion of the frame 91 as the holder portion 80 in this manner, the number of parts can be reduced and cost reduction can be achieved.

Further, the elastic modulus of the resin substrate 71 is 350 kg/mm² or less, while the elastic modulus of the holder portion 80 is 1000 kg/mm² or greater. The elastic modulus of the holder portion 80 is greater than the elastic modulus of the resin substrate 71.

The hologram layer 72 is a layer formed by a hologram material, in which a photosensitive monomer, such as an acrylic polymer, is dispersed in a binder resin, such as an urethane resin, an epoxy resin, or a cellulose resin, being adhered to the resin substrate 71, and subsequently interference exposure being performed thereon. As a result of the interference exposure, interference fringes 74 are recorded in the hologram layer 72, as changes in refractive index, changes in transmittance, and shape changes such as convex and concave patterns. Therefore, the second diffraction element 70 diffracts and deflects the imaging light L0 in a predetermined direction, as illustrated in FIG. 3. The specific wavelength and a specific incident angle respectively correspond to a wavelength and an incident angle of the imaging light L0.

In the present exemplary embodiment, the thickness of the hologram layer 72 is from 5 μm to 25 μm, and the elastic modulus is 350 kg/mm$^2$ or less. In addition, the elastic modulus of the hologram layer 72 is lower than the elastic modulus of the resin substrate 71. Therefore, when the resin substrate 71 deforms, the hologram layer 72 is deformable following the deformation of the resin substrate 71.

The resin substrate 71 includes convex portions 75 formed on the inner surface 71a so as to extend in a plate thickness direction of the resin substrate 71. The convex portion 75 is integrally formed on the inner surface 71a of the resin substrate 71. A side surface 75a of the convex portion 75 is a surface along an axis O extending in the plate thickness direction of the resin substrate 71. In the present exemplary embodiment, the side surface 75a of the convex portion 75 intersects (is orthogonal to) the inner surface 71a of the resin substrate 71. Note that although, above, the side surface 75a of the convex portion 75 is the surface along the axis extending in the plate thickness direction of the resin substrate 71, the side surface 75a is not limited to being orthogonal to the inner surface 71a of the resin substrate 71, and may be slightly inclined with respect to the inner surface 71a of the resin substrate 71. By applying light shielding ink to a surface of the convex portion 75 to absorb the external light incident on the convex portion 75, generation of stray light may be suppressed.

Each of the holder portions 80 includes a support plate portion 80a that supports the resin substrate 71, and a side plate portion 80b that is provided on an outer edge end portion of the support plate portion 80a and extends upward from the support plate portion 80a. Each of the holder portions 80 includes a concave portion 81 into which the convex portion 75 of the resin substrate 71 is inserted. The concave portion 81 is formed in the support plate portion 80a. A through hole 80a1 is formed in the support plate portion 80a. The through hole 80a1 exposes the inner surface 71a of the resin substrate 71. The through hole 80a1 is formed such that the hologram layer 72 is positioned on the inner side thereof. Light diffracted by the hologram layer 72 and the external light transmitted through the hologram layer 72 are favorably guided to the eye E of the observer via the through hole 80a1. The concave portion 81 includes an inner side surface 81a located on a center side of the inner surface 71a of the resin substrate 71, and an outer side surface 81b located on an outer edge side of the inner surface 71a of the resin substrate 71. The inner side surface 81a and the outer side surface 81b of the concave portion 81 are surfaces along the axis O extending in the plate thickness direction of the resin substrate 71.

As illustrated in FIG. 4, at a usage environmental temperature (−20° C. to 40° C.), the resin substrate 71 is attached to the holders 80 in a state in which a contracting force generated by the contraction of the resin substrate 71 is inhibited by the convex portions 75 coming into contact with the inner surfaces 81a of the concave portions 81. As a result, the resin substrate 71 of the present exemplary embodiment is fixed to the holder portions 80 in a state in which a tensile stress acts the resin substrate 71.

In this state, the convex portions 75 and the concave portions 81 are pressed against each other. In other words, in the present exemplary embodiment, one of the side surface 75a of the convex portion 75 and the inner surface 81a of the concave portion 82 configures a contact surface that causes the holder portion 80 and the resin substrate 71 to come into contact with each other, and the other of the side surface 75a of the convex portion 75 and the inner surface 81a of the concave portion 82 configures a pressing surface that presses the contact surface.

Next, a method of producing the second diffraction element 70 will be described with reference to the drawings. Below, "environmental temperature" refers to a temperature of a surrounding environment in which the second diffraction element 70 is produced.

Figure 5A:
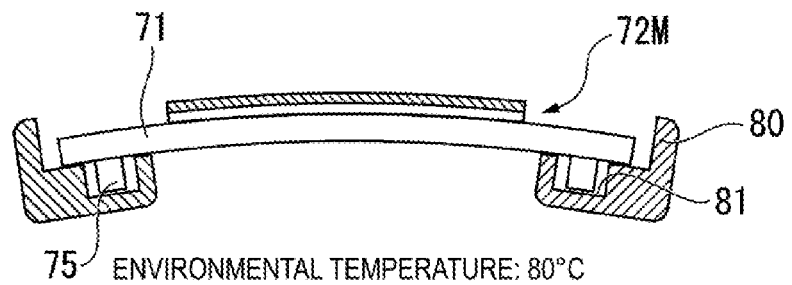
FIG. 5A is a diagram illustrating a production step of the second diffraction element.
Figure 5B:
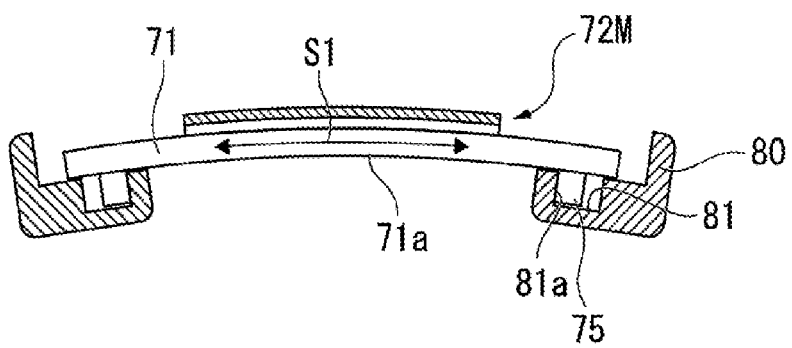
FIG. 5B is a diagram illustrating the production step of the second diffraction element.
Figure 5C:
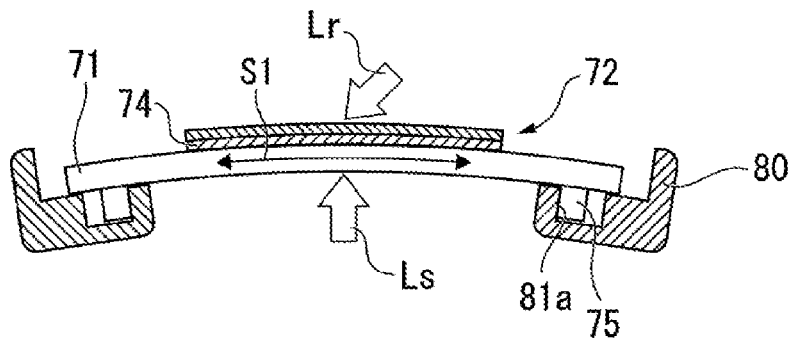
FIG. 5C is a diagram illustrating the production step of the second diffraction element.

FIGS. 5A to 5C are diagrams illustrating a production step of the second diffraction element 70.

First, as illustrated in FIG. 5A, with the environmental temperature set to 80° C., the resin substrate 71, on which a hologram material 72M is adhered to the outer surface 71b, is attached to the holder portions 80.

Specifically, the resin substrate 71 is disposed on the holder portions 80 so that the convex portions 75 of the resin substrate 71 are fitted into the concave portions 81 of the holder portions 80. Here, the shape of the concave portion 81 of the holder portion 80 is formed to be larger than the shape of the convex portion 75 of the resin substrate 71. The convex portion 75 and the concave portion 81 are designed so that the centers thereof coincide with each other at an environmental temperature of 80° C.

Next, the environmental temperature is returned to 20° C. at which interference exposure, which will be described below, is performed. At this time, as the environmental temperature falls, the resin substrate 71 having the larger thermal expansion coefficient contracts more than the holder portion 80 having the smaller thermal expansion coefficient. For example, when the environmental temperature falls to approximately 50° C., the convex portions 75 of the resin substrate 71 come into contact with the inner surfaces 81a of the concave portions 81 in the holder portions 80, as illustrated in FIG. 5B. In addition, when the environmental temperature falls below 50° C., the resin substrate 71 attempts to contract further, but the resin substrate 71 cannot contract further as the convex portions 75 come into contact with the concave portions 81 of the holder portions 80. In other words, when the environmental temperature is 50° C. or lower, a tensile stress S1 acts on the resin substrate 71.

In this way, the production method of the present exemplary embodiment includes a first step in which the convex portions 75 are caused to come into contact with the inner surfaces 81a of the concave portions 81 under the environment of 50° C., which is a temperature higher than both an upper limit (40° C.) of the usage environmental temperature of the display device 100, and an exposure environmental temperature (20° C.) at which the interference exposure is performed to form the interference fringes 74 on the hologram layer 72 to be described below.

Next, the interference exposure is performed on the hologram material 72M with the environmental temperature set to 20° C.

As illustrated in FIG. 5C, in the interference exposure, the exposure is performed by causing interference between reference light Lr and object light Ls in the hologram material 72M, and the hologram layer 72 is obtained that includes the interference fringes 74. Note that either planar waves or spherical waves may be used as the reference light Lr and the object light Ls.

In the present exemplary embodiment, the imaging light L0 of red light, green light, and blue light is incident on the second diffraction element 70, and the incident imaging light L0 is diffracted and emitted in the predetermined direction. The interference fringes 74 of the hologram layer 72 illustrated in FIG. 5C include interference fringes formed at a pitch corresponding to red imaging light with a wavelength of 615 nm, for example, in a wavelength range from 580 nm to 700 nm, interference fringes formed at a pitch corresponding to green imaging light with a wavelength of 535 nm, for example, in a wavelength range from 500 nm to 580 nm, and interference fringes formed at a pitch corresponding to blue imaging light with a wavelength of 460 nm, for example, in a wavelength range from 400 nm to 500 nm.

The hologram material 72M of the present exemplary embodiment is formed by laminating holographic photosensitive layers having a sensitivity corresponding to each of the wavelengths. Therefore, in the interference exposure, the interference fringes 74 are formed by performing the interference exposure on each of the holographic photosensitive layers using the reference light and the object light having each of the wavelengths.

As described above, the second diffraction element 70 according to the present exemplary embodiment is produced.

Note that by dispersing, in the holographic photosensitive layer, a photosensitive material having a sensitivity corresponding to each of the wavelengths, and then performing the interference exposure on the holographic photosensitive layer using the reference light and the object light having each of the wavelengths, the interference fringes 74 may be formed in which the interference fringes corresponding to the red light, the green light, and the blue light are superimposed on one another in one layer.

Incidentally, in a reaction step in which the interference fringes 74 are formed in the hologram layer 72 by the interference exposure, the hologram material 72M expands or contracts. Whether the hologram material 72M expands or contracts depends on the material composition and the reaction step. During the interference exposure, the resin substrate 71 attempts to deform along with the hologram material 72M as a result of the expansion or the contraction of the hologram material 72M. At this time, as described above, as a result of the convex portions 75 being fitted into the concave portions 81 so as to be pressed against each other, the tensile stress S1 is generated in the resin substrate 71. In other words, as long as the convex portions 75 are maintained to be in contact with the inner surfaces 81a of the concave portions 81, the resin substrate 71 is restrained by the holder portions 80 and does not change in dimension.

According to the production method of the present exemplary embodiment, when performing the interference exposure on the hologram layer 72, even when the resin substrate 71 attempts to expand or contract, deformation of the resin substrate 71 is suppressed by the holder portions 80. As a result, since the interference fringes 74 are formed in the hologram layer 72 in a state in which the deformation of the resin substrate 71 is suppressed, a deterioration in performance of the hologram layer 72 due to the deformation of the resin substrate 71 can be suppressed.

As described above, the second diffraction element 70 of the present exemplary embodiment is produced by causing the convex portions 75 to come into contact with the inner surfaces 81a of the concave portions 81 and thereby fixing the resin substrate 71 to the holder portions 80 at a temperature (50° C.) higher than the upper limit (40° C.) of the usage environmental temperature of the display device 100 and the exposure environmental temperature (20° C.) at which the interference exposure is performed.

A dimension between the convex portions 75 in the second diffraction element 70 changes depending on the environmental temperature. Changes in the dimension between the convex portions 75 in accordance with the environmental temperature will be described below. In addition, an effect of the second diffraction element 70 obtained by the dimensional change between the convex portions 75 will be described.

Figure 6:
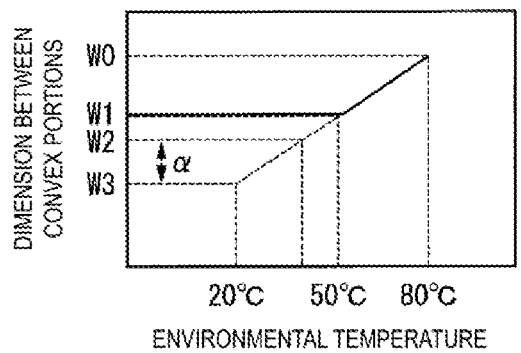
FIG. 6 is a graph showing changes in a dimension between convex portions caused by an environmental temperature.

FIG. 6 is a graph showing the changes in the dimension between the convex portions 75 of the resin substrate 71 caused by the environmental temperature. In FIG. 6, the horizontal axis indicates the environmental temperature, and the vertical axis indicates a size of the dimension between the convex portions 75.

In FIG. 6, the dimension between the convex portions 75 of the resin substrate 71 when the environmental temperature is 80° C. is defined as W0. In other words, W0 corresponds to the dimension between the convex portions 75 in the state illustrated in FIG. 5A.

As illustrated in FIG. 6, when the environmental temperature falls to 50° C., the resin substrate 71 contracts, and the dimension between the convex portions 75 changes to W1.

Here, for ease of explanation, the thermal expansion coefficient of the holder portions 80 is assumed to be 0 ppm/° C. In this case, as illustrated in FIG. 6, even when the environmental temperature falls below 50° C., the dimension between the convex portions 75 of the resin substrate 71 does not change from W1. At this time, as described above, since the resin substrate 71 is prevented from contracting in the state in which the convex portions 75 are in contact with the inner surfaces 81a of the concave portions 81, the tensile stress acts on the resin substrate 71.

Further, a case in which the usage environmental temperature is set to its lower limit of −20° C. will be considered. At this time, the resin substrate 71 attempts to contract further, but since the dimensional change is restricted by the convex portions 75 coming into contact with the inner surfaces 81a of the concave portions 81, the dimension between the convex portions 75 does not change from W1. Therefore, according to the second diffraction element 70 of the present exemplary embodiment, at the lower limit (−20° C.) of the usage environmental temperature, the convex portions 75 are maintained to be in contact with the inner side surfaces 81a of the concave portions 81.

Further, a case in which the usage environmental temperature is set to its upper limit of 40° C. will be considered. At this time, due to the expansion of the resin substrate 71, the convex portions 75 attempt to deform in a direction away from the inner side surfaces 81a of the concave portions 81. However, as described above, since the convex portions 75 and the concave portions 81 are designed to come into contact with each other at a temperature of 50° C. or lower, the convex portions 75 are not separated from the inner side surfaces 81a of the concave portions 81 unless the usage environmental temperature exceeds 50° C. Thus, when the usage environmental temperature is 40° C., although the resin substrate 71 attempts to expand, since the convex portions 75 are maintained to be in contact with the inner surfaces 81a of the concave portions 81, the resin substrate 71 does not change in dimension beyond an amount of deformation arising from the thermal expansion coefficient of the holder portions 80. Thus, the dimension between the convex portions 75 does not change from W1. Therefore, according to the second diffraction element 70 of the present exemplary embodiment, the convex portions 75 are maintained to be in contact with the inner side surfaces 81a of the concave portions 81 at the upper limit (40° C.) of the usage environmental temperature.

Further, changes in the dimension between the convex portions 75 during the interference exposure will be described in detail with reference to FIG. 6. In FIG. 6, the dimension between the convex portions 75 of the resin substrate 71 is assumed to be W2 in a case in which the interference exposure is performed in a state in which the resin substrate 71 is not fixed to the holder portions 80. At this time, as a result of the resin substrate 71 expanding along with the hologram material 72M due to the interference exposure, the dimension between the convex portions 75 of the resin substrate 71 extends by a and changes to a dimension W3. In this case, if the dimension W3 (W2+a) after the expansion is smaller than W1 and satisfies a relationship of W3<W1, the convex portions 75 are not separated from the inner surfaces 81a of the concave portions 81. Thus, the dimension between the convex portions 75 does not change from W1. Therefore, according to the second diffraction element 70 of the present exemplary embodiment, when the interference exposure of the hologram layer 72 is performed, the convex portions 75 are maintained to be in contact with the inner surfaces 81a of the concave portions 81.

The resin substrate 71 and the holder portions 80 are preferably fixed together by the convex portions 75 and the concave portions 81 in at least four locations or more.

FIGS. 7A to 7D are diagrams each illustrating an arrangement example of the convex portions 75 and the concave portions 81. FIGS. 7A to 7D are diagrams when viewing the second diffraction element 70 from the holder portion 80 side. For ease of illustration, the resin substrate 71 having a curved shape and the holder portion 80 are illustrated in a state of being expanded in a plate shape.

Figure 7A:
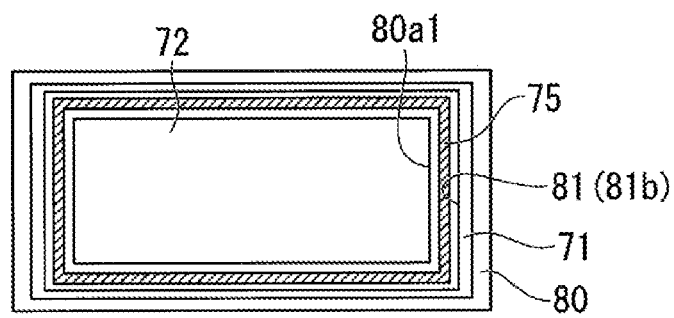
FIG. 7A is a diagram illustrating an arrangement example of the convex portions and concave portions.

As illustrated in FIG. 7A, the convex portion 75 is formed in a frame shape along four sides of the rectangular resin substrate 71. The concave portion 81 is formed in a frame shape surrounding the periphery of the rectangular through hole 80a1. According to this configuration, the deformation of the resin substrate 71 can be suppressed in all directions. Thus, the deterioration in the performance of the hologram layer 72 due to the deformation of the resin substrate 71 can be minimized.

Figure 7B:
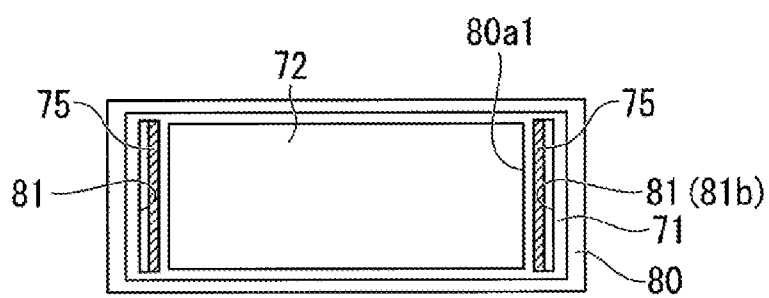
FIG. 7B is a diagram illustrating an arrangement example of the convex portions and the concave portions.

Further, as illustrated in FIG. 7B, the convex portions 75 may be formed along a pair of short sides of the four sides of the rectangular resin substrate 71. In this case, the concave portions 81 are formed along the two sides of the rectangular through hole 80a1. According to this configuration, the deformation on long sides of the resin substrate 71, which are susceptible to an influence from the dimensional change, can be suppressed by the convex portions 75 and the concave portions 81. In addition, since the convex portions 75 and the concave portions 81 are not disposed above and below the resin substrate 71 and the holder portions 80, a dimension of the second diffraction element 70 in the vertical direction can be suppressed.

Figure 7C:
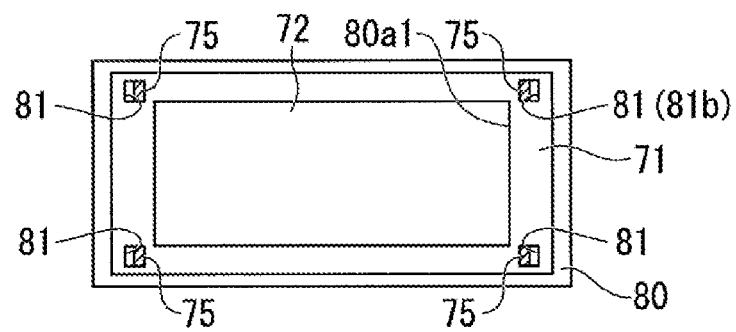
FIG. 7C is a diagram illustrating an arrangement example of the convex portions and the concave portions.

Further, as illustrated in FIG. 7C, the convex portions 75 may be formed in four corners of the rectangular resin substrate 71. In this case, the concave portions 81 are formed in the vicinity of four corners of the rectangular through hole 80a1. According to this configuration, the deformation on the long sides and the short sides of the resin substrate 71 can be suppressed.

Figure 7D:
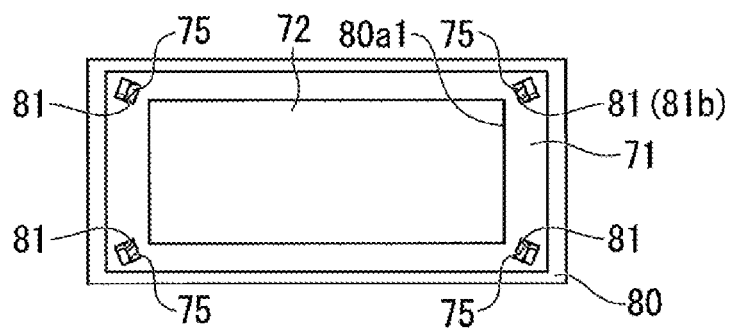
FIG. 7D is a diagram illustrating an arrangement example of the convex portions and the concave portions.

Note that when the convex portions 75 are formed in the four corners of the resin substrate 71, pairs of the convex portions 75 may be disposed so as to face each other in diagonal directions as illustrated in FIG. 7D. According to this configuration, the deformation, in the diagonal directions, of the resin substrate 71 having large dimensions can be suppressed.

According to the second diffraction element 70 of the present exemplary embodiment, by causing the convex portions 75 to come into contact with the inner surfaces 81a of the concave portions 81, the resin substrate 71 is fixed to the holder portions 80 at a temperature (50° C.) higher than the upper limit (40° C.) of the usage environmental temperature and the exposure environmental temperature (20° C.) at which the interference exposure is performed. Thus, the tensile stress can be generated in the resin substrate 71, even when the interference exposure is being performed on the hologram material 72M, or at the usage environmental temperature (−20° C. to 40° C.). As a result, even when the interference exposure is being performed on the hologram material 72M, or at the usage environmental temperature (−20° C. to 40° C.), the dimensional change of the resin substrate 71 is inhibited from occurring beyond the amount of deformation arising from the thermal expansion coefficient of the holder portions 80.

Therefore, in the second diffraction element 70 of the present exemplary embodiment, the deterioration in the performance of the hologram layer 72 due to the deformation of the resin substrate 71 is suppressed, and a desired diffraction performance can thus be obtained. In addition, since the deterioration in the performance of the hologram layer 72 due to the deformation of the resin substrate 71 is suppressed at the usage environmental temperature (−20° C. to 40° C.), the second diffraction element 70 of the present exemplary embodiment can obtain the desired diffraction performance. Thus, the second diffraction element 70 of the present exemplary embodiment can efficiently condense the imaging light L0 toward the eye E of the observer, as illustrated in FIG. 3.

The first diffraction element 50 having the same basic configuration as the second diffraction element 70 is also configured by a reflective-type volume holographic element. Since the first diffraction element 50 is produced using the same production method as that of the second diffraction element 70, the same effects as those of the second diffraction element 70 can be obtained. In other words, since the deterioration in the performance of the hologram layer 72 due to the deformation of the resin substrate 71 is suppressed, the first diffraction element 50 can provide a diffraction element that obtains the desired diffraction performance.

In addition, since the second diffraction element 70 of the present exemplary embodiment employs the resin substrate 71 as a support substrate that supports the hologram layer 72, in comparison to a case in which a glass substrate is used as the support substrate, the second diffraction element 70 forms a diffraction element that is lighter in weight, less prone to breakage, and has better durability.

An incident surface 50a of the first diffraction element 50, on which the imaging light L0 is incident, has a recessed concave surface shape. In other words, the incident surface 50a has a shape having a central portion recessed and curved with respect to a peripheral portion thereof in the incident direction of the imaging light L0. Thus, the first diffraction element 50 can efficiently deflect the imaging light L0 toward the light guiding system 60, as illustrated in FIG. 3.

Figure 8:
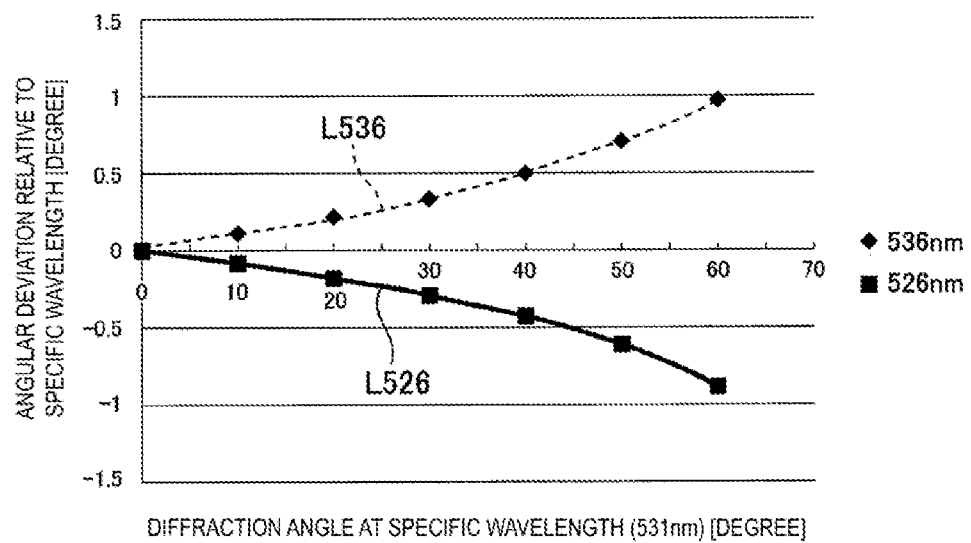
FIG. 8 is an explanatory diagram illustrating diffraction characteristics of a first diffraction element and the second diffraction element.

FIG. 8 is an explanatory diagram illustrating diffraction characteristics of the first diffraction element 50 and the second diffraction element 70 illustrated in FIG. 3. FIG. 8 illustrates differences in a diffraction angle between the specific wavelength and a peripheral wavelength when a light ray is incident on one point on the volume hologram. In FIG. 8, when the specific wavelength is 531 nm, a deviation in the diffraction angle of light with the peripheral wavelength of 526 nm is indicated by a solid line L526, and a deviation in the diffraction angle of light with the peripheral wavelength of 536 nm is indicated by a dotted line L536. As illustrated in FIG. 8, even when the light ray is incident on the same interference fringe recorded in the hologram, a light ray with a longer wavelength is more significantly diffracted, and a light ray with a shorter wavelength is less likely to be diffracted. Thus, when two diffraction elements, namely, the first diffraction element 50 and the second diffraction element 70 are used as in the present exemplary embodiment, proper wavelength compensation cannot be performed unless the light rays are caused to be incident while taking into account the respective ray angles of the incident light with a longer wavelength and a shorter wavelength with respect to the specific wavelength. In other words, color aberration occurring in the second diffraction element 70 cannot be canceled. Further, since the diffraction angle varies depending on the number of interference fringes, the interference fringes need to be taken into account.

In the optical system 10 illustrated in FIG. 3, as described in JP-A-2017-167181, wavelength compensation, namely, the color aberration can be canceled since the incident direction on the second diffraction element 70 and the like are made appropriate based on the number of times an intermediate image is formed between the first diffraction element 50 and the second diffraction element 70, and on whether a sum of the number of reflections by the mirror 62 is odd or even.

Specifically, as illustrated in FIG. 3, the imaging light L0 incident on the first diffraction element 50 is diffracted and deflected by the first diffraction element 50. At this time, the light L2 on the long wavelength side with respect to the specific wavelength has a diffraction angle $\theta_2$ larger than a diffraction angle $\theta_1$ of the light L1 with the specific wavelength. Further, the light L3 on the short wavelength side with respect to the specific wavelength has a diffraction angle $\theta_3$ smaller than the diffraction angle $\theta_1$ of the light L1 with the specific wavelength. Therefore, the imaging light L0 emitted from the first diffraction element 50 is deflected and dispersed at each of the wavelengths.

The imaging light L0 emitted from the first diffraction element 50 is incident on the second diffraction element 70 via the light guiding system 60, and is then diffracted and deflected by the second diffraction element 70. At this time, on an optical path from the first diffraction element 50 to the second diffraction element 70, the intermediate image is formed once, and reflection by the mirror 62 is performed once. Therefore, when an incident angle is defined as an angle between the imaging light L0 and a normal line of an incident surface of the second diffraction element 70, the light L2 on the long wavelength side with respect to the specific wavelength has an incident angle $\theta_{12}$ larger than an incident angle $\theta_{11}$ of the light L1 with the specific wavelength, and the light L3 on the short wavelength side with respect to the specific wavelength has an incident angle $\theta_{13}$ smaller than the incident angle $\theta_{11}$ of the light L1 with the specific wavelength. Further, as described above, the light L2 on the long wavelength side with respect to the specific wavelength has the diffraction angle $\theta_2$ larger than the diffraction angle $\theta_1$ of the light L1 with the specific wavelength, and the light L3 on the short wavelength side with respect to the specific wavelength has the diffraction angle $\theta_3$ smaller than the diffraction angle $\theta_1$ of the light L1 with the specific wavelength.

Accordingly, the light L2 on the long wavelength side with respect to the specific wavelength is incident on the first diffraction element 50 at a greater incident angle than the light L1 with the specific wavelength, but since the light L2 on the long wavelength side with respect to the specific wavelength has a larger diffraction angle than the light L1 with the specific wavelength, the light L2 on the long wavelength side with respect to the specific wavelength and the light L1 with the specific wavelength become substantially parallel with each other when being emitted from the second diffraction element 70. In contrast, the light L3 on the short wavelength side with respect to the specific wavelength is incident on the first diffraction element 50 at a smaller incident angle than the light L1 with the specific wavelength, but since the light L3 on the short wavelength side with respect to the specific wavelength has a smaller diffraction angle than the light L1 with the specific wavelength, the light L3 on the short wavelength side with respect to the specific wavelength and the light L1 with the specific wavelength become substantially parallel with each other when being emitted from the second diffraction element 70. In this way, as illustrated in FIG. 3, the imaging light L0 emitted from the second diffraction element 70 is incident on the eye E of the observer as substantially parallel light, and thus, a shift in an imaging position on a retina E0 at each of the wavelengths is suppressed. Therefore, the color aberration occurring in the second diffraction element 70 can be canceled.

As a result of the first diffraction element 50 and the second diffraction element 70 of the present exemplary embodiment being produced using the production method described above, an influence of warping that occurs during the interference exposure is reduced, and the interference fringes that obtain the desired diffraction performance are thus formed. Therefore, according to the first diffraction element 50 and the second diffraction element 70 of the present exemplary embodiment, the color aberration can be accurately canceled as described above.

Now, a conjugate relationship between the first diffraction element 50 and the second diffraction element 70 will be described.

Figure 9A:
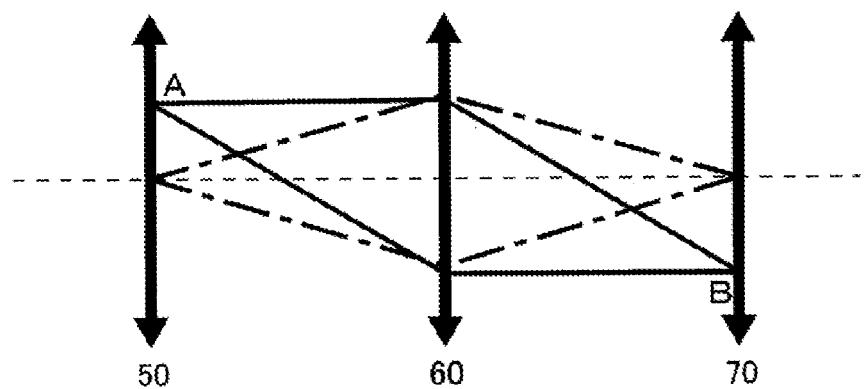
FIG. 9A is an explanatory diagram of a case in which the first diffraction element and the second diffraction element are in a conjugate relationship.
Figure 9B:
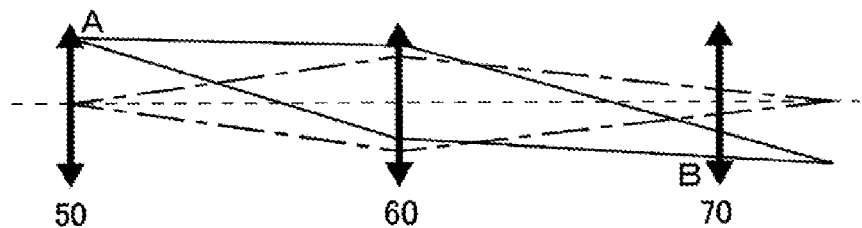
FIG. 9B is an explanatory diagram of a case in which the first diffraction element and the second diffraction element are not in the conjugate relationship.
Figure 9C:
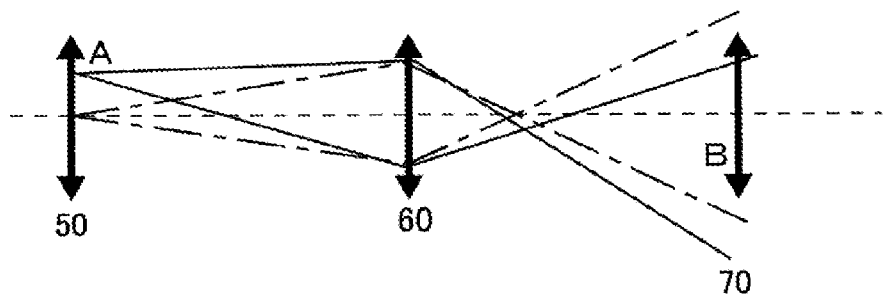
FIG. 9C is an explanatory diagram of a case in which the first diffraction element and the second diffraction element are not in the conjugate relationship.
Figure 10A:
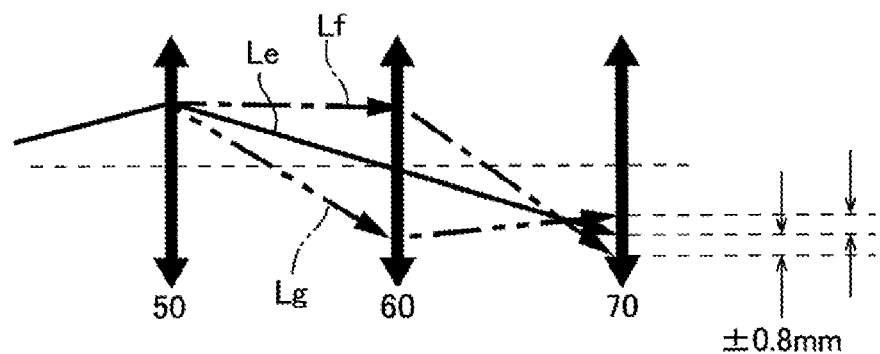
FIG. 10A is an explanatory diagram illustrating a tolerance for deviation from the conjugate relationship between the first and second diffraction elements.
Figure 10B:
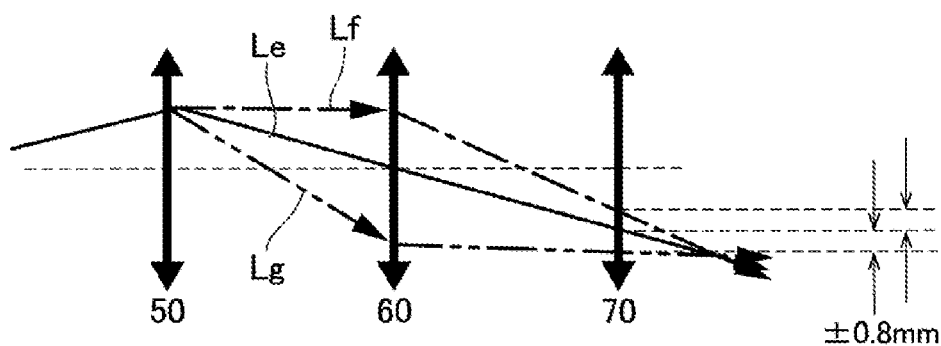
FIG. 10B is an explanatory diagram of another mode illustrating the tolerance for the deviation from the conjugate relationship.

FIG. 9A is an explanatory diagram of a case in which the first diffraction element 50 and the second diffraction element 70 are in the conjugate relationship. FIGS. 9B and 9C are explanatory diagrams of cases in which the first diffraction element 50 and the second diffraction element 70 are not in the conjugate relationship. FIGS. 10A and 10B are explanatory diagrams illustrating a tolerance for deviation from the conjugate relationship between the first diffraction element 50 and the second diffraction element 70 illustrated in FIGS. 9B and 9C. In FIG. 10A and FIG. 10B, light with the specific wavelength is indicated by a solid line Le, light with a wavelength shorter than the specific wavelength by 10 nm (−10 nm) is indicated by a dot-dash line Lf, and light with a wavelength longer than the specific wavelength by 10 nm (+10 nm) is indicated by a two-dot chain line Lg. Note that, in FIGS. 9A to 9C, FIG. 10A, and FIG. 10B, for ease of understanding the passage of the light, the first diffraction element 50, the second diffraction element 70, and the light guiding system 60 are each illustrated as transmissive-type and are indicated by arrows.

As illustrated in FIG. 9A, when the first diffraction element 50 and the second diffraction element 70 are in the conjugate relationship, divergent light rays emitted from a point A (a first position) of the first diffraction element 50 are condensed by the light guiding system 60 having positive power, and are incident at a point B (a second position corresponding to the first position) of the second diffraction element 70. Therefore, the color aberration caused by the diffraction occurring at the point B can be compensated for at the point A.

In contrast, as illustrated in FIG. 9B and FIG. 9C, when the first diffraction element 50 and the second diffraction element 70 are not in the conjugate relationship, the divergent light rays emitted from the point A of the first diffraction element 50 are condensed by the light guiding system 60 located at the center therebetween and having positive power, but the divergent light rays are incident while intersecting with each other at a position beyond the point B on the second diffraction element 70 or at a position between the first diffraction element 50 and the point B. Thus, the point A and the point B are not in a one-to-one relationship. Here, since a compensation effect is enhanced when the interference fringes are uniform within a region, the compensation effect is reduced when the first diffraction element 50 and the second diffraction element 70 are not in the conjugate relationship. On the other hand, it is difficult to compensate for the entire projection region of the second diffraction element 70 using the first diffraction element 50. Therefore, in the aspects illustrated in FIG. 9B and FIG. 9C, sufficient wavelength compensation cannot be achieved, and thus a deterioration in resolution occurs.

Note that with respect to the light with the wavelengths longer and shorter than the specific wavelength by 10 nm (±10 nm), there is an error of approximately ±0.4 mm from the point B at which the light with the specific wavelength arrives, but the deterioration in resolution is not noticeable. Results of examination of such a permissible range indicate that the deterioration in resolution is not noticeable, as illustrated in FIG. 10A, when the light rays intersect with each other at a point between the first diffraction element 50 and the point B on the second diffraction element 70, and are incident in a range of ±0.8 mm from the point B, the point B corresponding to an ideal point at which the light with the specific wavelength arrives. Further, the deterioration in resolution is not noticeable, as illustrated in FIG. 10B, when the light rays intersect with each other at a point beyond the point B on the second diffraction element 70, and are incident in the range of ±0.8 mm from the point B, the point B corresponding to the ideal point at which the light with the specific wavelength arrives. Therefore, even when the first diffraction element 50 and the second diffraction element 70 are not in a perfect conjugate relationship, the deterioration in resolution is permissible when the first diffraction element 50 and the second diffraction element 70 are in a substantially conjugate relationship, and the light rays arrive within the range of ±0.8 mm from the ideal point B. In other words, in the present exemplary embodiment, the conjugate relationship between the first diffraction element 50 and the second diffraction element 70 means that an incident position of the light with the specific wavelength has an error range of ±0.8 mm from the ideal incident point.

Figure 11:
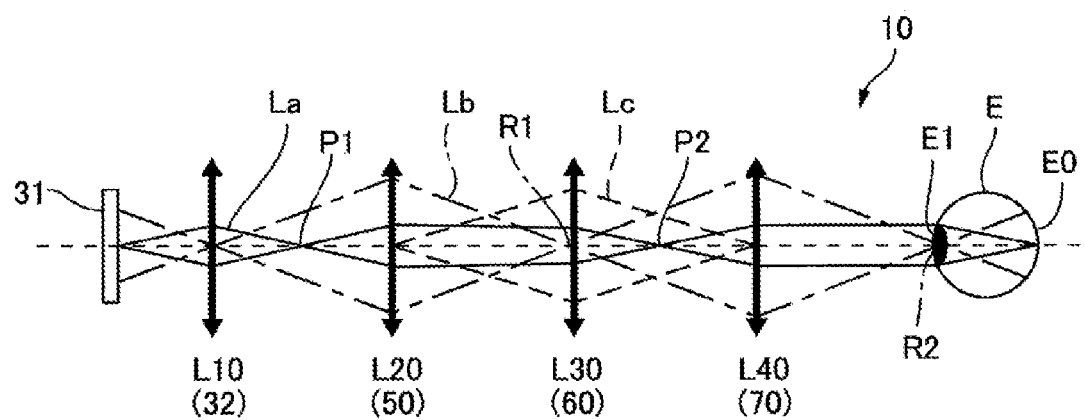
FIG. 11 is a light ray diagram of the optical system.

FIG. 11 is a light ray diagram of the optical system 10 of the present exemplary embodiment. In FIG. 11, each of the optical units disposed along an optical axis is indicated by a thick arrow. Further, solid lines La indicate light rays emitted from one pixel of the imaging light generating device 31, dot-dash lines Lb indicate principal rays emitted from an end portion of the imaging light generating device 31, and long dashed lines Lc indicate a position that has a conjugate relationship with the first diffraction element 50.

Here, "intermediate image" refers to a location at which the light rays (the solid lines La) emitted from the one pixel converge, and "pupil" refers to a location at which the principal rays (the dot-dash lines Lb) of each angle of view converge. Further, FIG. 11 illustrates the passage of light emitted from the imaging light generating device 31. Note that in FIG. 11, all the optical units are illustrated as transparent-type in order to simplify the diagram.

As illustrated in FIG. 11, the optical system 10 of the present exemplary embodiment includes the first optical unit L10 having positive power, the second optical unit L20 including the first diffraction element 50 and having positive power, the third optical unit L30 having positive power, and the fourth optical unit L40 including the second diffraction element 70 and having positive power, and the first to fourth optical units L10 to L40 are provided along an optical path of the imaging light emitted from the imaging light generating device 31.

A focal length of the first optical unit L10 is L/2. Focal lengths of the second optical unit L20, the third optical unit L30, and the fourth optical unit L40 are all L. Therefore, an optical path length from the second optical unit L20 to the third optical unit L30 is equal to an optical path length from the third optical unit L30 to the fourth optical unit L40.

In such an optical system 10, a first intermediate image P1 of the imaging light is formed between the first optical unit L10 and the third optical unit L30, a pupil R1 is formed between the second optical unit L20 and the fourth optical unit L40, a second intermediate image P2 of the imaging light is formed between the third optical unit L30 and the fourth optical unit L40, and the fourth optical unit L40 collimates the imaging light to form an exit pupil R2. At this time, the third optical unit L30 freely controls the imaging light emitted from the second optical unit L20, and causes the imaging light to enter the fourth optical unit L40 as divergent light, convergent light, or parallel light. The second optical unit L20 causes the imaging light emitted from the first optical unit L10 to be incident on the third optical unit L30 as convergent light. In the optical system 10 of the present exemplary embodiment, the pupil R1 is formed in the vicinity of the third optical unit L30 between the second optical unit L20 and the fourth optical unit L40. The vicinity of the third optical unit L30 refers to a position, between the second optical unit L20 and the third optical unit L30, that is closer to the third optical unit L30 than to the second optical unit L20, or a position, between the third optical unit L30 and the fourth optical unit L40, that is closer to the third optical unit L30 than to the fourth optical unit L40.

Further, for the imaging light emitted from one point of the imaging light generating device 31, the third optical unit L30 causes the light with the peripheral wavelength, which is deflected by the first diffraction element 50 and has deviated from the specific wavelength, to enter a predetermined range of the second diffraction element 70. In other words, the first diffraction element 50 and the second diffraction element 70 are in the conjugate relationship or a substantially conjugate relationship. Here, an absolute value of magnification of projection on the second diffraction element 70 by the third optical unit L30 of the first diffraction element 50 ranges from 0.5 times to 10 times, and the absolute value of such a magnification preferably ranges from 1 time to 5 times.

Thus, according to the optical system 10 of the present exemplary embodiment, the first intermediate image P1 of the imaging light is formed between the projection optical system 32 and the light guiding system 60, the pupil R1 is formed in the vicinity of the light guiding system 60, the second intermediate image P2 of the imaging light is formed between the light guiding system 60 and the second diffraction element 70, and the second diffraction element 70 collimates the imaging light to form the exit pupil R2.

In the optical system 10 of the present exemplary embodiment, the first intermediate image P1 is formed between the first optical unit L10 (the projection optical system 32) and the second optical unit L20 (the first diffraction element 50).

According to the optical system 10 of the present exemplary embodiment, four conditions (Conditions 1, 2, 3, and 4) described below are satisfied.

Condition 1: Light rays emitted from one point of the imaging light generating device 31 are formed into an image as one point on the retina E0.

Condition 2: An incident pupil of the optical system and the pupil of the eye are in the conjugate relationship.

Condition 3: The first diffraction element 50 and the second diffraction element 70 are properly disposed so as to compensate for the peripheral wavelengths.

Condition 4: The first diffraction element 50 and the second diffraction element 70 are in the conjugate relationship or the substantially conjugate relationship.

More specifically, as can be understood from the solid lines La illustrated in FIG. 11, Condition 1 is satisfied in that the light rays emitted from one point of the imaging light generating device 31 are formed into an image as one point on the retina E0. Thus, the observer can visibly recognize one pixel. Further, as can be understood from the solid lines La illustrated in FIG. 11, Condition 2 is satisfied, which is that the incident pupil of the optical system 10 and the pupil E1 of the eye E are in the conjugate relationship (conjugation of the pupil), and thus the entire region of the image generated by the imaging light generating device 31 can be visually recognized. Further, since Condition 3 is satisfied, which is that the first diffraction element 50 and the second diffraction element 70 are properly disposed so as to compensate for the peripheral wavelengths, and the color aberration occurring in the second diffraction element 70 can be canceled by performing the wavelength compensation. Further, as can be understood from the long dashed lines Lc illustrated in FIG. 11, in order to satisfy Condition 4, which is that the first diffraction element 50 and the second diffraction element 70 are in the conjugate relationship or the substantially conjugate relationship, in the first diffraction element 50 and the second diffraction element 70, light rays can be made incident on a location having the same interference fringes, and thus the wavelength compensation can be properly performed. As a result, the deterioration in resolution of the imaging light can be suppressed.

Therefore, according to the optical system 10 of the present exemplary embodiment, by properly performing the wavelength compensation, a high-quality image can be visually recognized by the observer while suppressing the deterioration in resolution. Further, the optical system 10 of the present exemplary embodiment is provided with the first diffraction element 50 and the second diffraction element 70 that are lightweight and have excellent impact resistance, by using a plastic substrate as a support body. Therefore, the optical system 10 of the present exemplary embodiment is lightweight and has excellent impact resistance, and is thus suitably used as an optical system of the display device 100 mounted on the head of the observer.

Second Exemplary Embodiment

Next, an optical system according to a second exemplary embodiment will be described. A difference between the present exemplary embodiment and the first embodiment is the environmental temperature in the step of causing the resin substrate and the holder portions to come into contact with each other. Note that components common to the first exemplary embodiment will be given identical reference signs, and detailed descriptions thereof will be omitted.

In the present exemplary embodiment also, the configuration of the second diffraction element will be described as an example, but the same applies to the first diffraction element.

Figure 12:
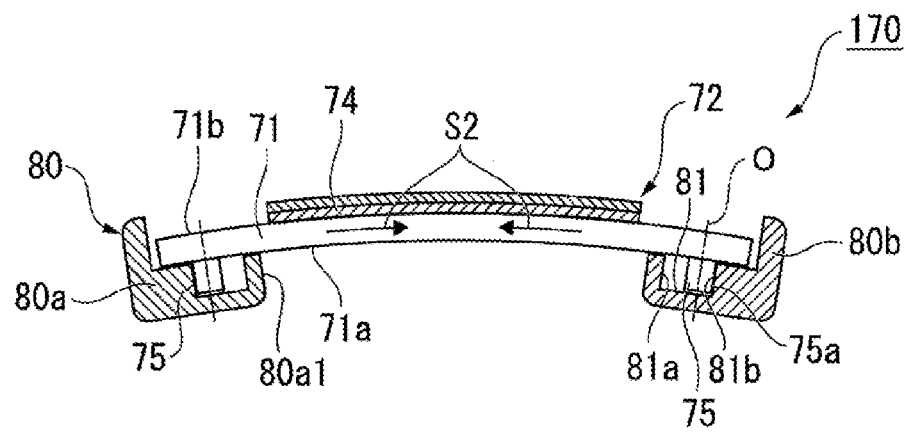
FIG. 12 is a cross-sectional view illustrating a configuration of main components of a second diffraction element according to a second exemplary embodiment.

FIG. 12 is a cross-sectional view illustrating a configuration of main components of a second diffraction element of the present exemplary embodiment. Note that FIG. 12 illustrates a state of the second diffraction element at the usage environmental temperature (−20° C. to 40° C.)

As illustrated in FIG. 12, in a second diffraction element 170 of the present exemplary embodiment, at the usage environmental temperature (−20° C. to 40° C.), the resin substrate 71 is attached to the holder portions 80 in a state in which an expansion force of the resin substrate 71 itself attempting to expand is inhibited by the convex portions 75 coming into contact with the outer surfaces 81b of the concave portions 81. In the present exemplary embodiment, the resin substrate 71 is fixed to the holder portions 80 in a state in which a compressive stress acts on the resin substrate 71. In this state, the convex portions 75 and the concave portions 81 are pressed against each other.

Next, a method of producing the second diffraction element 170 will be described with reference to the drawings.

Figure 13A:
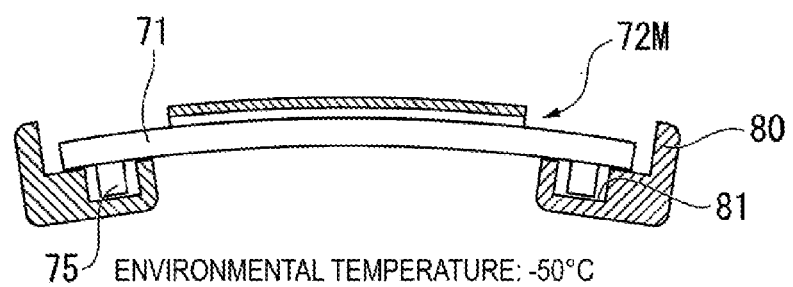
FIG. 13A is a diagram illustrating a production step of the second diffraction element according to the second exemplary embodiment.
Figure 13B:
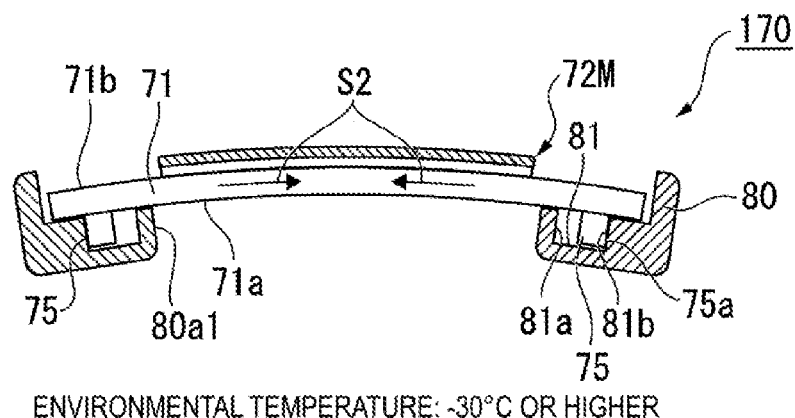
FIG. 13B is a diagram illustrating the production step of the second diffraction element according to the second exemplary embodiment.

FIGS. 13A and 13B are diagrams illustrating a production step of the second diffraction element 170.

First, as illustrated in FIG. 13A, with the environmental temperature set to −50° C., the resin substrate 71, on which the hologram material 72M is adhered to the outer surface 71b, is attached to the holder portions 80.

Next, the environmental temperature is returned to 20° C. at which the interference exposure is performed. At this time, as the environmental temperature increases, the resin substrate 71 having the larger thermal expansion coefficient expands more than the holder portions 80 having the smaller thermal expansion coefficient. For example, when the environmental temperature rises up to approximately −30° C., as illustrated in FIG. 13B, the convex portions 75 of the resin substrate 71 come into contact with the outer surfaces 81b of the concave portions 81 in the holder portions 80. Further, when the environmental temperature rises above −30° C., the resin substrate 71 attempts to expand further, but the resin substrate 71 cannot expand since the convex portions 75 come into contact with the concave portions 81 of the holder portions 80. In other words, when the environmental temperature becomes −30° C. or higher, a compressive stress S2 starts to act on the resin substrate 71.

As described above, the production method of the present exemplary embodiment includes a first step in which the convex portions 75 are caused to come into contact with the outer surfaces 81b of the concave portions 81 with the environmental temperature set to −30° C., which is lower than both the lower limit (−20° C.) of the usage environmental temperature of the display device 100 and the exposure environmental temperature (20° C.)

Next, the interference exposure is performed on the hologram material 72M with the environmental temperature set to 20° C. In the production method of the present exemplary embodiment, in the resin substrate 71 in which the resin substrate 71 attempts to deform due to the expansion or contraction of the hologram material 72M during the interference exposure, the compression stress S2 is generated as a result of the convex portions 75 being fitted into the concave portions 81 so as to be pressed against each other. Therefore, as long as the convex portions 75 are maintained to be in contact with the outer surfaces 81*b* of the concave portions 81, the resin substrate 71 is restrained by the holder portions 80 and does not change in dimension. Thus, since the interference fringes 74 are formed in the hologram layer 72 in a state in which the deformation of the resin substrate 71 is suppressed, the deterioration in the performance of the hologram layer 72 due to the deformation of the resin substrate 71 can be suppressed.

As described above, the second diffraction element 170 of the present exemplary embodiment is produced by fixing the resin substrate 71 to the holder portions 80 while causing the convex portions 75 to come into contact with the outer surfaces 81*b* of the concave portions 81 at a temperature (−30° C.) lower than the lower limit (−20° C.) of the usage environmental temperature of the display device 100 and the exposure environmental temperature (20° C.) at which the interference exposure is performed.

In the second diffraction element 170 of the present exemplary embodiment, the resin substrate 71 attempts to expand further, for example, at 40° C. that is the upper limit of the usage environmental temperature, but since the dimensional change of the resin substrate 71 is restricted by the convex portions 75 coming into contact with the outer surfaces 81*b* of the concave portions 81, the resin substrate 71 cannot change in dimension beyond the amount of deformation arising from the thermal expansion coefficient of the holder portion 80.

In addition, in the second diffraction element 170 of the present exemplary embodiment, by contracting at −20° C., which is the lower limit of the usage environmental temperature, the resin substrate 71 attempts to deform in a direction in which the convex portions 75 move away from the outer surfaces 81*b* of the concave portions 81. However, as described above, since the convex portions 75 and the concave portions 81 are designed to come into contact with each other at −30° C., the convex portions 75 are not separated from the outer surfaces 81*b* of the concave portions 81 unless the usage environmental temperature falls below −30° C. Thus, when the usage environmental temperature is −20° C., although the resin substrate 71 attempts to contract, since the convex portions 75 are maintained to be in contact with the outer surfaces 81*b* of the concave portions 81, the resin substrate 71 cannot change in dimension beyond the amount of deformation arising from the thermal expansion coefficient of the holder portion 80.

Therefore, according to the second diffraction element 170 of the present exemplary embodiment, since the resin substrate 71 is fixed to the holder portions 80 while causing the convex portions 75 to come into contact with the outer surface 81*b* of the concave portions 81 at a temperature (−30° C.) lower than the lower limit (−20° C.) of the usage environmental temperature and the exposure environmental temperature (20° C.) at which the interference exposure is performed, the compressive stress can be generated in the resin substrate 71 even when the interference exposure is being performed on the hologram material 72M or at the usage environmental temperature (−20° C. to 40° C.). As a result, even when the interference exposure is being performed on the hologram material 72M, or at the usage environmental temperature (−20° C. to 40° C.), the dimensional change of the resin substrate 71 is inhibited from occurring beyond the amount of deformation arising from the thermal expansion coefficient of the holder portions 80.

Therefore, in the second diffraction element 170 of the present exemplary embodiment, the deterioration in the performance of the hologram layer 72 due to the deformation of the resin substrate 71 is suppressed, and the desired diffraction performance can thus be obtained. As a result, according to the second diffraction element 170 of the present exemplary embodiment, the imaging light L0 can be efficiently condensed toward the eye E of the observer, as illustrated in FIG. 3.

Note that the above-described exemplary embodiments are preferred exemplary embodiments of the present disclosure, the present disclosure is not limited to the exemplary embodiments described above, and various modifications are possible within the scope that does not depart from the gist of the present disclosure. For example, in the exemplary embodiments described above, an example is given of a case in which the convex portions 75 formed on the resin substrate 71 are fitted into the concave portions 81 formed in the holder portions 80, but convex portions formed in the holder portion 80 may be fitted into concave portions formed in the resin substrate 71.

Figure 14:
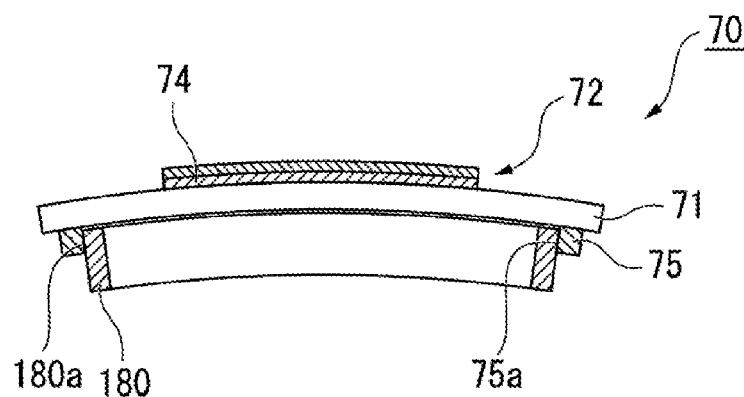
FIG. 14 is a diagram illustrating a fixing structure according to a modified example.

Further, the method of fixing the resin substrate 71 to the holder portions 80 is not limited to the configuration in which the convex portions 75 and the concave portions 81 are used. FIG. 14 is a cross-sectional view illustrating a fixing structure according to a modified example.

As illustrated in FIG. 14, for example, the resin substrate 71 may be fixed to holder portions 180 by causing outer circumferential surfaces 180*a*, each having a circular frame shape, of the holder portions 180 to come into contact with the inner side surfaces 75*a* of the circular cylindrical convex portions 75. In this case, one of the side surface 75*a* of the convex portion 75 and the outer circumferential surface 180*a* of the holder portion 180 configures the contact surface, and the other of the side surface 75*a* and the outer circumferential surface 180*a* configures the pressing surface. Note that the planar shapes of the holder portion 180 and the convex portion 75 are not particularly limited, and may be formed in a quadrangular frame shape, for example.

Further, although the above-described exemplary embodiments are described using the reflection-type volume holographic element as an example, the present disclosure can also be applied to a transmissive-type volume holographic element.

In addition, in the above-described exemplary embodiments, the holder portion 80 supports the observer side (inner surface 71*a*) of the resin substrate 71, but the holder portion 80 may support the hologram layer 72 side of the resin substrate 71. When the holder portion 80 is provided so as to support the hologram layer 72 side in this manner, the deformation of the hologram layer 72 is further suppressed during the interference exposure.

Further, in the above-described exemplary embodiments, although an example is given of a case in which the holder portion 80 is configured by Super Invar, the material of the holder portion 80 may be a metal having a lower thermal expansion coefficient and a greater elastic modulus than the resin substrate 71, such as titanium, stainless steel, aluminum, or the like. Further, a plastic filled with a filler, such as silica, may be used as the material of the holder portion 80.

What is claimed is:
1. An optical element comprising:
a hologram layer;
a resin substrate to which the hologram layer is adhered; and a holder portion configured to support the resin substrate and having a thermal expansion coefficient smaller than that of the resin substrate, wherein one of the holder portion and the resin substrate includes a contact surface along an axis extending in a plate thickness direction of the resin substrate, and other of the holder portion and the resin substrate includes a pressing surface that presses the contact surface, wherein a surface of the hologram layer adhered to the resin substrate extends from a first end to a second end, and the first end of the hologram layer to the second end of the hologram layer is a first length, wherein a surface of the resin substrate adhered to the hologram layer extends from a first end to a second end, and the first end of the resin substrate to the second end of the resin substrate is a second length, wherein the second length of the resin substrate is greater than the first length of the hologram layer, wherein the one of the holder portion and the resin substrate includes a concave portion, the other of the holder portion and the resin substrate includes a convex portion that is inserted into the concave portion, one of the concave portion and the convex portion configures the contact surface, and other of the concave portion and the convex portion configures the pressing surface.

2. The optical element according to claim 1, wherein the holder portion has an elastic modulus greater than that of the resin substrate.

3. The optical element according to claim 1, wherein planar shapes of the concave portion and the convex portion are frame shapes.

4. The optical element according to claim 1, wherein the resin substrate has a curved shape.

5. A method of producing the optical element according to claim 1, the method comprising a first step of causing the pressing surface to come into contact with the contact surface at a temperature higher than both an upper limit of a usage environmental temperature, at which the optical element is used, and an exposure environmental temperature, at which interference exposure is performed to form interference fringes in the hologram layer.

6. The method of producing the optical element according to claim 5, wherein in the first step, a hologram material for forming the hologram layer is adhered to the resin substrate, and after the first step, the interference exposure is performed on the hologram material adhered to the resin substrate, thereby, forming the hologram layer.

7. A method of producing the optical element according to claim 1, the method comprising a first step of causing the pressing surface to come into contact with the contact surface at a temperature lower than both a lower limit of a usage environmental temperature, at which the optical element is used, and an exposure environmental temperature, at which interference exposure is performed to form interference fringes in the hologram layer.

8. A display device comprising:

an imaging light generating device configured to generate imaging light; and an optical system including a diffraction element that diffracts the imaging light emitted from the imaging light generating device, wherein the diffraction element is configured of the optical element according to claim 1.

9. The display device according to claim 8, comprising a frame configured to mount the optical element on a head of an observer, with the hologram layer being placed in front of an eye of the observer, wherein the holder portion is a portion of the frame.

* * * * *